(12) United States Patent
Anaya et al.

(10) Patent No.: US 9,703,608 B2
(45) Date of Patent: *Jul. 11, 2017

(54) VARIABLE CONFIGURATIONS FOR WORKLOAD DISTRIBUTION ACROSS MULTIPLE SITES

(71) Applicant: International Business Machines Corporation, Armonk, NY (US)

(72) Inventors: Jaime F. Anaya, San Jose, CA (US); Paul M. Cadarette, Hemet, CA (US); Michael G. Fitzpatrick, Raleigh, NC (US); David B. Petersen, Great Falls, VA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/095,273

(22) Filed: Dec. 3, 2013

(65) Prior Publication Data

US 2014/0108662 A1 Apr. 17, 2014

Related U.S. Application Data

(63) Continuation of application No. 13/477,323, filed on May 22, 2012, now Pat. No. 9,641,449.

(51) Int. Cl.
*G06F 9/50* (2006.01)
*G06F 11/20* (2006.01)
(Continued)

(52) U.S. Cl.
CPC .......... *G06F 9/505* (2013.01); *G06F 11/2023* (2013.01); *G06F 11/2035* (2013.01);
(Continued)

(58) Field of Classification Search
CPC ....... H04L 67/1002; H04L 2029/06054; H04L 67/1008; H04L 67/101; G06F 11/2076; G06F 17/30575–17/30581; G06F 9/505
(Continued)

(56) References Cited

U.S. PATENT DOCUMENTS 6,122,630 A 9/2000 Strickler et al.
6,574,605 B1 * 6/2003 Sanders ......... G06Q 10/063112
379/265.01

(Continued)

OTHER PUBLICATIONS

Final Office Action for U.S. Appl. No. 13/081,078, mailed Oct. 24, 2013, 40 pages.

(Continued)

*Primary Examiner* — Gregory Todd
(74) *Attorney, Agent, or Firm* — Cantor Colburn LLP; William Kinnaman

(57) ABSTRACT

Embodiments include a method, system, and computer program product for maintaining continuous availability. An embodiment of the present invention includes receiving a unit of work data. The unit of work data is distributed among the plurality of workloads using either an active/standby configuration, an active/query configuration, an active/partitioned configuration, or an active/active configuration. A primary workload is selected from a plurality of workloads to process the unit of work data based on a workload distribution rule. It is determined if the primary workload is capable of processing the unit of work data based on user configurable settings. If the primary site is capable of processing the unit of work data then the unit of work data is transmitted to the primary workload. Otherwise the unit of work data is transmitted to a secondary workload. The unit of work data is replicated between the primary workload and the secondary workload.

5 Claims, 9 Drawing Sheets

(51) Int. Cl.
*G06F 17/30* (2006.01)
*H04L 29/08* (2006.01)
*H04L 12/911* (2013.01)
*G06F 11/34* (2006.01)

(52) U.S. Cl.
CPC ...... *G06F 11/2038* (2013.01); *G06F 11/2076* (2013.01); *G06F 11/2097* (2013.01); *G06F 17/30575* (2013.01); *H04L 47/70* (2013.01); *H04L 67/101* (2013.01); *H04L 67/1002* (2013.01); *H04L 67/1008* (2013.01); *G06F 11/3409* (2013.01); *G06F 11/3419* (2013.01); *G06F 11/3433* (2013.01); *G06F 2201/81* (2013.01)

(58) Field of Classification Search
USPC .................................. 709/223, 226
See application file for complete search history.

(56) References Cited

U.S. PATENT DOCUMENTS

| | | | |
|---|---|---|---|
| 6,865,601 | B1 | 3/2005 | Cherkasova et al. |
| 7,350,186 | B2 | 3/2008 | Coleman et al. |
| 7,636,916 | B2 | 12/2009 | Bello et al. |
| 7,702,791 | B2 | 4/2010 | Halpern et al. |
| 2002/0091854 | A1 | 7/2002 | Smith |
| 2004/0133591 | A1 | 7/2004 | Holenstein et al. |
| 2006/0106922 | A1 | 5/2006 | Arregoces et al. |
| 2006/0200501 | A1* | 9/2006 | Holenstein et al. .......... 707/202 |
| 2007/0143365 | A1 | 6/2007 | D'Souza et al. |
| 2007/0255766 | A1* | 11/2007 | Di Giglio et al. ............ 707/204 |
| 2009/0307166 | A1* | 12/2009 | Routray et al. ............... 706/46 |
| 2011/0099146 | A1* | 4/2011 | McAlister et al. ........... 707/634 |
| 2012/0259968 | A1 | 10/2012 | Anaya et al. |
| 2013/0007503 | A1 | 1/2013 | Anaya et al. |
| 2013/0117455 | A1* | 5/2013 | Shabtay et al. .............. 709/227 |
| 2013/0318221 | A1 | 11/2013 | Anaya et al. |

OTHER PUBLICATIONS

Final Office Action for U.S. Appl. No. 13/173,071, mailed Oct. 24, 2013, 41 pages.
Non Final Office Action for U.S. Appl. No. 13/081,078, mailed Mar. 28, 2013, 60 pages.
Non Final Office Action for U.S. Appl. No. 13/173,071, mailed Apr. 4, 2013, 59 pages
IBM, "A device to measure the efficiency and productivity of service operation and to estimate the workload or amount of service that is required for planned amount of the service or give workload respectively" IP.com, Jun. 18, 2003, 5 pages.
Cherkasova, Ludmila, "FLEX: Load Balancing and Management Strategy for Scalable Web Hosting Service", IEEE, 2000, p. 8-13.
IBM, "Triggering migration of critical workload on availability-affecting event with workload prioritization", IP.com, Jul. 14, 2009, 4 pages.
Continuity Central, [online]; [retrieved on Apr. 7, 2014]; retrieved from the Internet http://www.continuitycentral.com/feature0358.htm; Continuity Central, "Business Continuity Unwrapped . . . ," 2010, pp. 1-5.
J. Gantz, et al.; "The Expanding Digital Universe: A Forecast of Worldwide Information Growth Through 2010"; an IDC White Paper, EMC, IDC; Mar. 2007; pp. 1-24.
Rob Dearborn, et al.; "The Costs of Downtime: North American Medium Businesses 2006"; Infonetics Research; Mar. 2006; pp. 1-41.

* cited by examiner

VARIABLE CONFIGURATIONS FOR WORKLOAD DISTRIBUTION ACROSS MULTIPLE SITES

CROSS-REFERENCE TO RELATED APPLICATION

This application is a continuation of U.S. patent application Ser. No. 13/477,323, filed May 22, 2012, the disclosure of which is incorporated by reference herein in its entirety.

BACKGROUND

The present invention relates generally to continuous availability between sites at unlimited distances, and specifically to variable configurations for continuous availability of workloads in a multi-site environment.

Existing continuous availability and disaster recovery solutions are limited by a number of factors. Application availability protects against data loss, but is limited to a maximum amount of distance between sites. Existing solutions support a maximum distance that is considered too limited for many customer environments.

Disaster recovery solutions provide unlimited distance between sites with minimal data loss, but require starting systems, applications, and their supporting infrastructure on the backup site, which may take several hours.

Both disaster recovery and continuous availability systems additionally require modifications to software applications, such as database servers, and hardware, such as routers and switches, in order to implement the various disaster recovery and continuous availability functions, and therefore require additional cost and reconfiguration in order to implement. Existing disaster recovery and continuous availability solutions operate at a site or system level, not at a workload level. In addition, existing disaster recovery and continuous availability systems provide only a limited set of configurations for site to site availability and recovery, none of which apply to the workload.

SUMMARY

Embodiments include a method, system, and computer program product for maintaining continuous availability. An embodiment of the present invention includes receiving a unit of work data. The unit of work data is distributed among the plurality of workloads using either an active/standby configuration, an active/query configuration, an active/partitioned configuration, or an active/active configuration. A primary workload is selected from a plurality of workloads to process the unit of work data based on a workload distribution rule. It is determined if the primary workload is capable of processing the unit of work data based on one or more user configurable settings. If the primary site is capable of processing the unit of work data then the unit of work data is transmitted to the primary workload. Otherwise the unit of work data is transmitted to a secondary workload. The unit of work data is replicated between the primary workload and the secondary workload.

Additional features and advantages are realized through the techniques of the present embodiment. Other embodiments and aspects are described herein and are considered a part of the claimed invention. For a better understanding of the invention with the advantages and features, refer to the description and to the drawings.

BRIEF DESCRIPTION OF THE SEVERAL VIEWS OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

An embodiment includes a long distance continuous available system for providing continuous availability, disaster recovery, workload distribution and replication of application data across a plurality of sites at unlimited distances. The long distance continuous available system includes various system configurations for supporting workload level continuous availability disaster recovery, workload distribution and replication including active/active, active/standby, active/query, and active/partitioned, as will be described in more detail below.

The key metrics in business continuity are a recovery time objective (RTO), recovery point objective (RPO), and a network recovery objective (NRO). The RTO indicates the length of time that a company can afford to be without a system or multiple systems. The RPO indicates the amount of data a company can afford to lose if an outage occurs. The NRO is the length of time a company can go before a downed system is switched to a new network.

In a traditional availability and disaster recover implementation, signal latency over the network between two sites will impact online transaction processing (OLTP) throughput and batch duration resulting in the sites being separated by no more several tens of KM (fiber). Therefore, typical implementations don't provide enough site separation to support current disaster recovery needs.

In an embodiment, unit of work based replication is provided for one or more workloads across all of the sites of an organization. A unit of work is one or more transactions and/or processes performed as a group to service one or more requests. A workload consists of one or more applications and the application's middleware runtime environment, the data source objects being used by the applications, and the network addressability of the applications. Continuous availability, workload distribution, and replication services are provided for workloads executing on individual sites separated by an unlimited geographic area with nearly instantaneous workload redirection at a common point in time consistency for the workload data, all without requiring modification to existing user applications.

In an embodiment, two or more sites are separated by unlimited distances, running the same applications and having the same data to provide cross-site workload balancing and continuous availability and disaster recovery.

Figure 1:
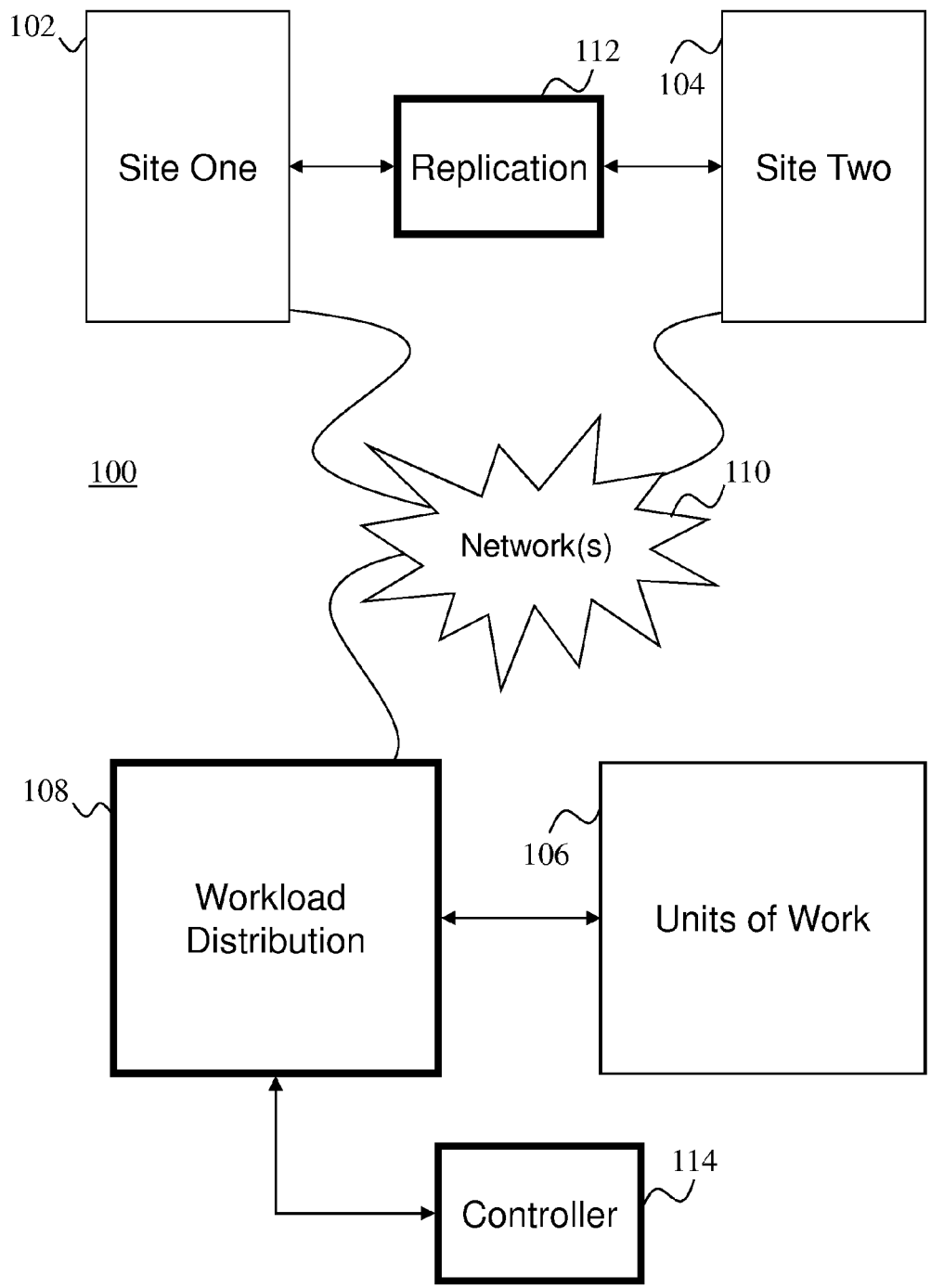
FIG. 1 illustrates a block diagram of a system for continuous availability across multiple sites at unlimited distances in an embodiment.

Turning now to FIG. 1, a system 100 for implementing continuous availability across multiple sites at unlimited distances will now be described. In an embodiment, the system includes one or more workload distribution modules 108 executing computer instructions for continuous availability across multiple sites at unlimited distances. The one or more workload distribution modules 108 may operate in any type of environment that is capable of executing a software application. The one or more workload distribution modules 108 may include a high-speed computer processing device, such as a mainframe computer, to manage the volume of operations governed by an entity for which a continuous availability across multiple sites at unlimited distances process is executing. In an embodiment, the one or more workload distribution modules 108 are part of an enterprise (e.g., a commercial business) that implements the continuous availability across multiple sites at unlimited distances.

In an embodiment, the system depicted in FIG. 1 includes one or more sites such as site one 102 and site two 104. Each of the sites includes one or more systems executing one or more workloads. The workloads include transaction processing applications, database applications, queue and queue management operations. Each of the sites includes one or more network hardware devices and/or software for managing and distributing network traffic among the one or more systems.

In an embodiment, the system depicted in FIG. 1 additionally includes a replication module 112. The replication module 112 replicates data for each of the workloads between site one 102 and site two 104 in both directions and will be described in more detail below. In an embodiment, the system depicted in FIG. 1 further includes a controller module 114. The controller module 114 controls the operation of various components such as the one or more workload distribution modules 108 as is described in more detail below.

The workload distribution modules 108 and the sites (102 and 104) are communicatively coupled via one or more networks 110. The networks 110 may be any type of known network including, but not limited to, a wide area network (WAN), a local area network (LAN), a global network (e.g., Internet), a virtual private network (VPN), an intranet and a telephone network. The networks 110 may be implemented using a wireless network or any kind of physical network implementation known in the art. The sites such as site one 102 and site two 104 may be coupled to the one or more workload distribution modules 108 through multiple networks (e.g., intranet and Internet) so that not all of the sites are coupled to the one or more workload distribution modules 108 through the same network.

The one or more workload distribution modules 108 depicted in the system of FIG. 1 may be implemented using one or more servers operating in response to a computer program stored in a storage medium accessible by the server.

In an embodiment, units of work 106 are distributed to one or more of the sites through the one or more workload distribution modules 108. The units of work include one or more pieces of data. In an embodiment, users of the various systems executing at the one or more sites initiate the units of work 106. In an embodiment, the units of work 106 are transmitted from systems outside of the sites site one 102 and site two 104 and are processed as workloads within one or more of the sites.

It will be understood that the execution of continuous availability across multiple sites at unlimited distances system and methods described in FIG. 1 may be implemented as modules in hardware, software executing on general-purpose hardware, or a combination thereof. Although only two sites are depicted in FIG. 1, it will be understood that the number of sites in FIG. 1 is limited for clarity and that, in an embodiment, any number of sites may be supported. In addition, in embodiments, any geographic distance may separate the sites. Furthermore, although the one or more workload distribution modules 108 are depicted as existing outside of the sites, it will be understood that, in an embodiment, the one or more workload distribution modules 108 may be located in one or more of the sites directly.

Figure 2:
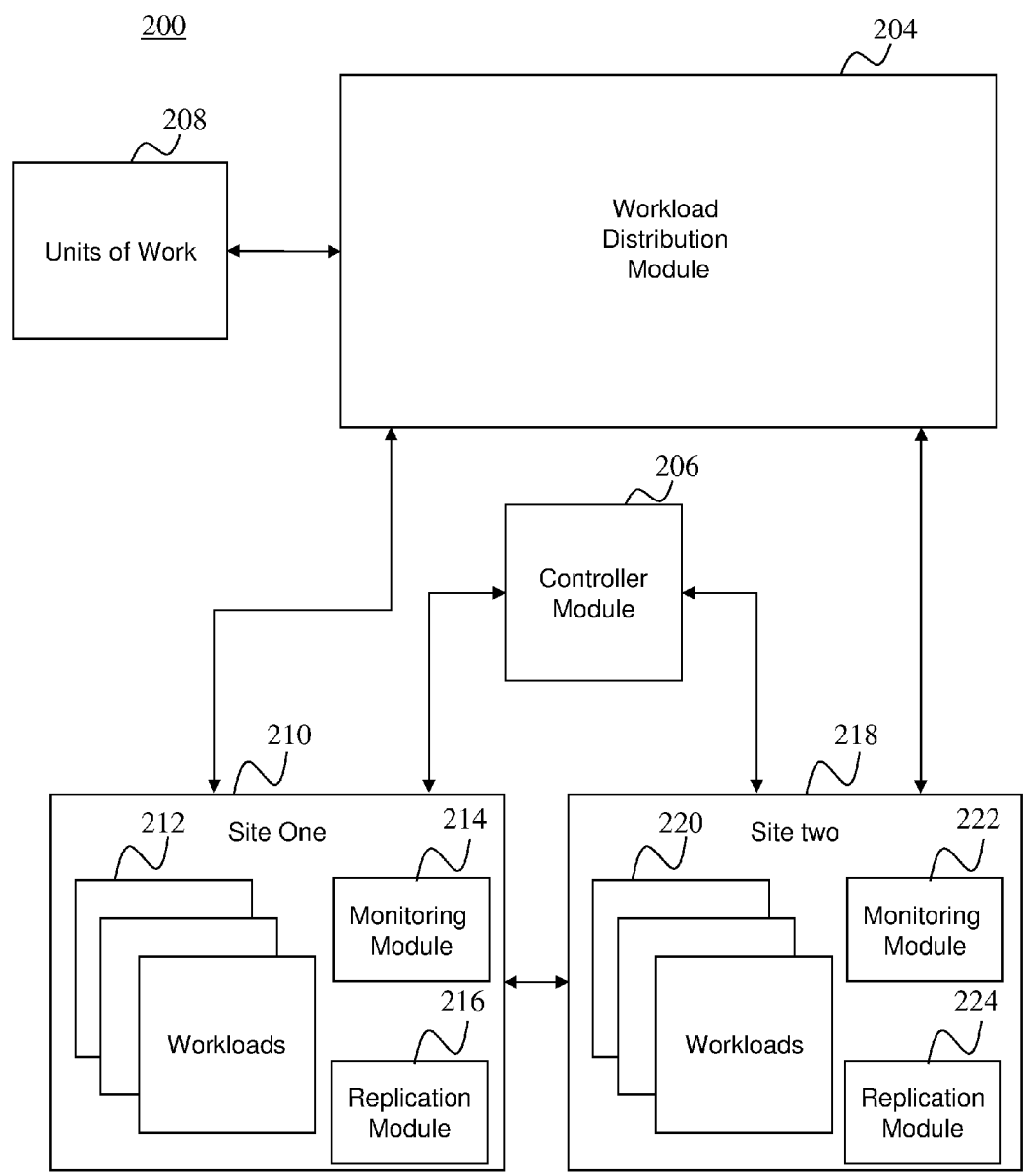
FIG. 2 illustrates a block diagram of the various components in a system for continuous availability across multiple sites at unlimited distances in accordance with an embodiment.

FIG. 2 illustrates a block diagram of the various components in a system for continuous availability across multiple sites at unlimited distances in accordance with an embodiment. A long distance continuous availability module 200 includes a workload distribution module 204. In an embodiment, the workload distribution module 204 collects metrics from each of site one 210 and site two 218. The metrics collected for each of the workloads include, but are not limited to, processor speed, pending transactions, transaction execution time, system availability, network bandwidth utilization and availability, replication latency, and any other performance-based metrics as is known in the art. In an embodiment, the workload distribution module 204 uses the metrics in order to distribute one or more units of work 208 for one or more workloads to site one 210 and site two 218. Two or more workloads may each execute on a separate site and be replicated to other sites. For example, a workload may execute on site one 210 and be replicated to site two 218, while a second workload executes on site two 218 and is replicated on site one 210 simultaneously.

In an embodiment, the units of work are received at one of the sites. Site one 210 is a computer system that is operating on one or more workloads 212. In an additional embodiment, site one 210 is a group of servers, such as a server farm, operating on one or more workloads using local load balancing, or other methods of distributing load as is known in the art. In yet another embodiment, site one 210 includes a plurality of systems, each system operating on one or more workloads. Site one 210 includes a combination of servers and server farms each operating on one or more workloads. Site one 210 includes one or more monitoring modules, such as site one monitoring module 214. The site one monitoring module 214 is communicatively coupled to the workload distribution module 204, such as through a network, and transmits metrics from the site one 210 to the workload distribution module 204. In an embodiment, the site one monitoring module 214 is executed on a single computer. In another embodiment, a monitoring module is executed on each of the systems executing at the site one 210. In yet another embodiment, a plurality of monitoring modules execute, one on each server, and report metrics to the workload distribution module 204. The site one monitoring module 214 is configured to monitor the systems executing at site one 210. In an embodiment, the site one monitoring module 214 is configured to monitor the available hardware processing capacity of the computer processors executing at the site one 210. In an embodiment, the site one monitoring module 214 is configured to monitor the available network capacity of the site one 210. In an embodiment, the site one monitoring module 214 is configured to monitor the one or more workloads 212 executing at the site one 210. In an embodiment, the site one monitoring module 214 monitors various characteristics of the one or more workloads 212 such as the number of queued transactions, the availability of the one or more workloads 212 to handle additional transactions, the number of threads operating on each of the one or more workloads 212, the replication latency, and any other workload specific characteristics as is known in the art.

In an embodiment, site two 218 includes one or more workloads 220, a site two monitoring module 222, and a site two replication module 224, configured identically to the site one 210. In an additional embodiment, site two 218 and site one 210 include additional workloads (not shown) that are not replicated or load balanced.

In an embodiment, each of the replication modules 216 and 224 are configured to replicate units of work between the one or more sites, such as site one 210 and site two 218. In an embodiment, the replication modules 216 and 224 collect units of work at each of the sites, and communicate those units of work to the other site over one or more networks, and coordinate the execution of those units of work on the other sites. In embodiments, any number of sites may be configured to provide load balancing and replication of units of work. In addition, although the controller module 206 is depicted as a stand-alone module, it will be understood that, in an embodiment, the controller module 206 may be executed in the long distance continuous availability module 200, or any of the sites.

In an embodiment, a controller module 206 is in communication with each of the sites, such as site one 210 and site two 218 and is configured to coordinate transactions and replication of the units of work between the various sites. The controller module 206 is in communication with the workload distribution module 204, and uses information provided by each of those modules to coordinate transactions and replication of the units of work for each workload between the various sites. In an embodiment, long distance continuous availability module 200 includes the controller module 206. In an embodiment, additional controller modules may be implemented to ensure high availability.

The illustration of FIG. 2 is a simplified representation of the various components of the long distance continuous availability module 200 for purposes of clarity. It will be understood by those of ordinary skill in the art, that additional or fewer components may be used in alternate embodiments. In additional embodiments, the layout and configuration of the components may differ from those of FIG. 2 without affecting the functionality of the long distance continuous availability module 200. In additional embodiments, the various components may be located in separate modules. In further embodiments, the functionality of various components may be incorporated into a single hardware or software module.

Figure 3:
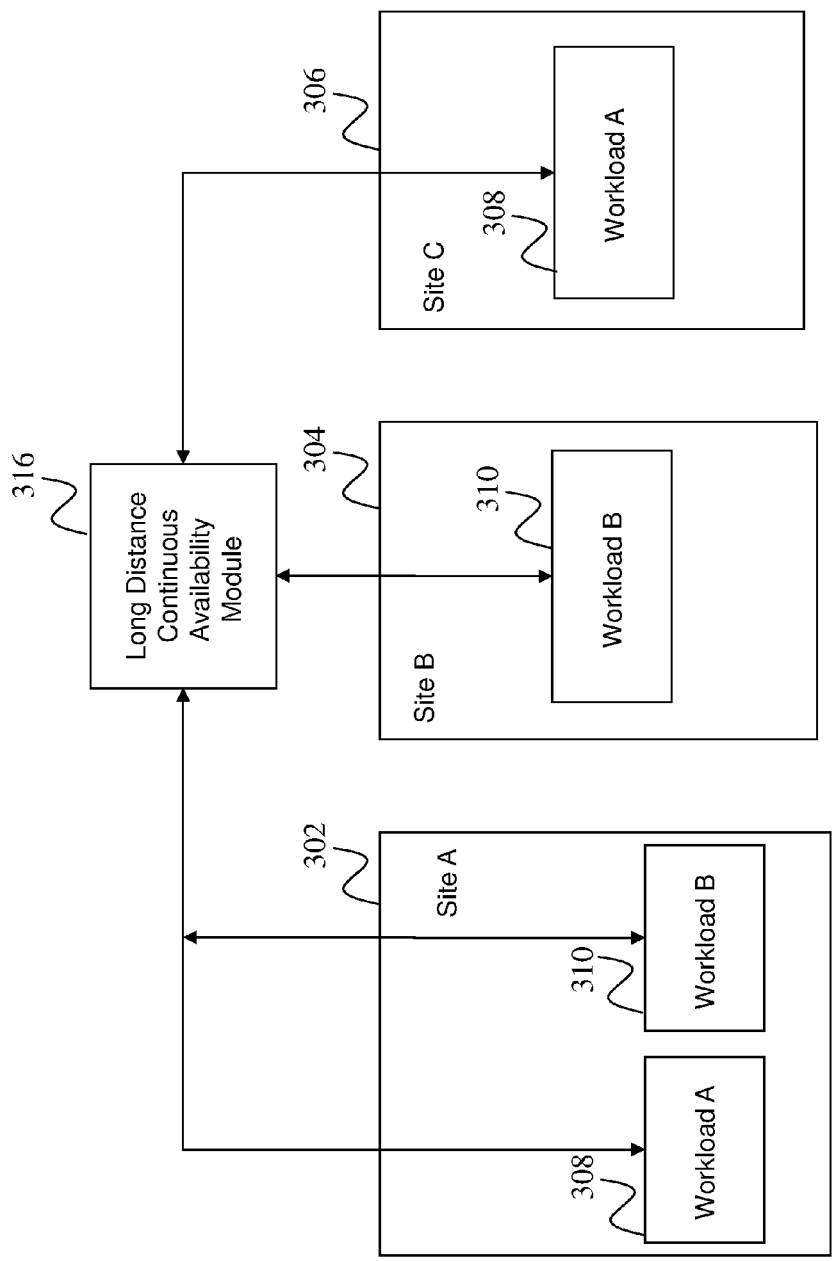
FIG. 3 is a block diagram that illustrates a simplified multi-site, multi-workload configuration in an unlimited distance continuous availability system in an embodiment.

FIG. 3 is a block diagram that illustrates a simplified multi-site, multi-workload, long distance continuous availability system in an embodiment. In an embodiment, the sites (Site A 302, Site B 304 and Site C 306) execute one or more applications for processing one or more workloads. Site A 302 may host a workload A 308 and a workload B 310. The workload A 308 and workload B 310 are provided with continuous availability and workload redirection provisions by a long distance continuous availability module 316. In an embodiment, the long distance continuous availability module 316 is in communication with the various sites via a network, such as the one or more networks 110 of FIG. 1. In an embodiment, the long distance continuous availability module 316 is configured to detect that workload A 308 on the primary site is down and automatically redirects (i.e. transmits future workload A 308) to one of the other sites, based upon policy. In an embodiment, workload redirection occurs because of an unplanned outage and is based on policy, workload configuration, and metrics received by a workload distribution module from a monitoring module, such as the site one monitoring module 214 of FIG. 2. In an embodiment, the workload redirection occurs because of a planned outage and is initiated by a script and/or instructions from an operator. When a workload, such as workload A 308 is redirected from Site A 302 to Site C 306, workload B 310 continues to execute on site A 302 unimpeded.

In an embodiment, the long distance continuous availability module 316 is restored back to the primary site automatically based on scripts and/or instructions from an operator. In yet another embodiment, the long distance continuous availability module 316 is restored back to the primary site automatically, or via command prompt, when it detects that the primary site is available.

The workloads and sites of FIG. 3 are provided for purposes of clarity, it will be understood that in alternate embodiments any number of sites and workloads may be implemented in any combination.

Figure 4:
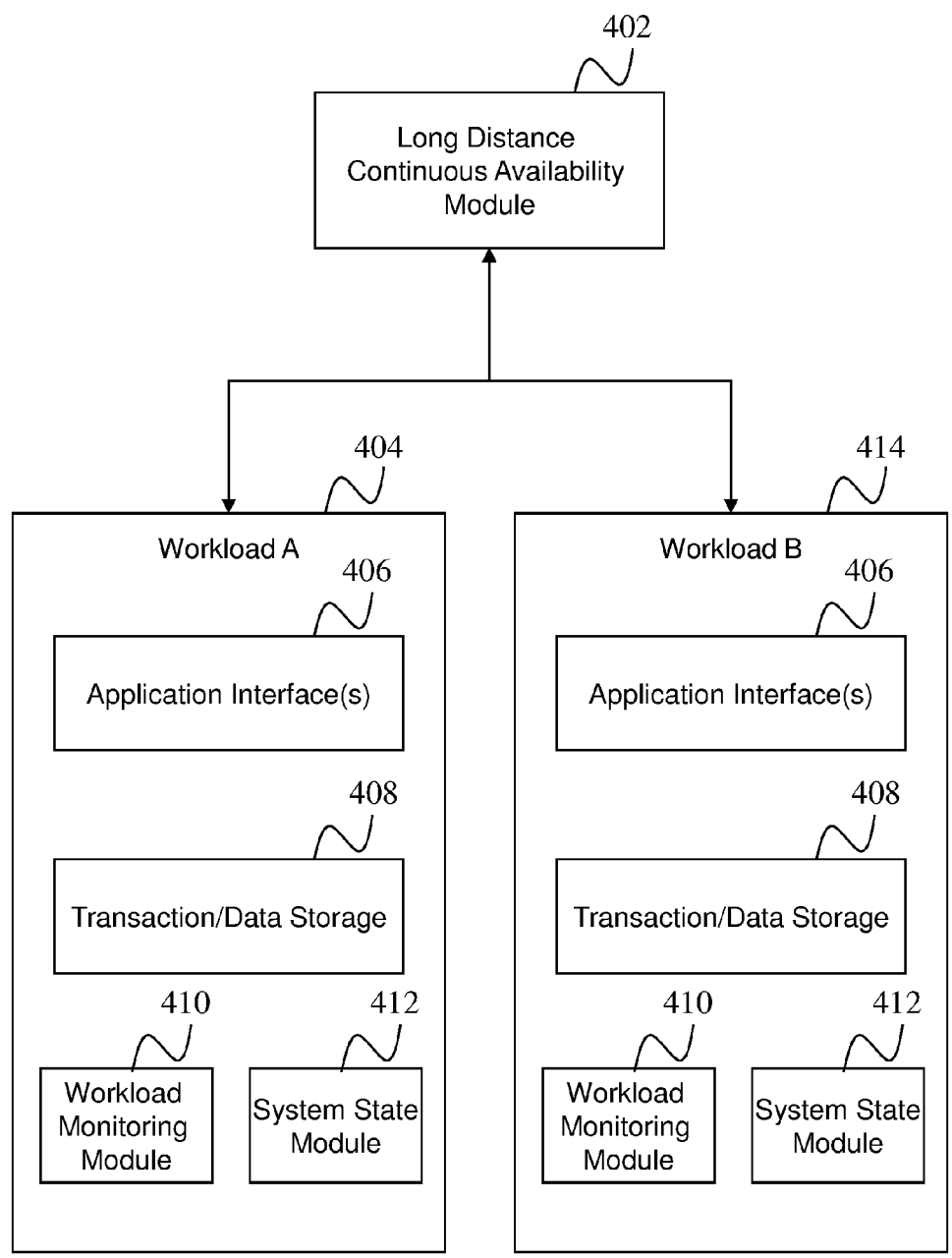
FIG. 4 illustrates a block diagram of an individual site implementation of the long distance continuous availability system in an embodiment.

FIG. 4 illustrates a block diagram of an individual site implementation of the long distance continuous availability system in an embodiment. The elements of FIG. 4 are executed on a site such as site one 210 of FIG. 2. In an embodiment, long distance continuous availability module 402 is communicatively coupled to the infrastructure of one or more workloads executing at a site. The long distance continuous availability module 402 coordinates distribution of units of work for the workload A 404 and the workload B 414. Each of workload A 404 and workload B 414 include an application interface 406. The application interface 406 facilitates communication of units of work to either of the workload A 404 and/or the workload B 414. The application interface 406 is configured to use any application interfaces such as TCP/IP, message queuing, remote procedure execution, or any other interface as is known in the art. Each of the workload A 404 and workload B 414 additionally include a transaction and data storage 408. In an embodiment, the transaction and data storage 408 is a database storage system. In an additional embodiment, the transaction and data storage 408 is a file-based system. In yet another embodiment, the transaction and data storage 408 is a transaction-based storage such as a queue. In yet another embodiment, the transaction and data storage 408 may be any storage as is known in the art.

In an embodiment, both workload A 404 and workload B 414 additionally include a workload monitoring module 410. In an embodiment, the workload monitoring module 410 monitors the performance of the workload and the system's processing load. In an embodiment, the workload monitoring module 410 is configured to determine the transaction processing speed of the workload, the number of threads executing for the workload, the number of transactions queued for processing, the replication latency, and/or any other workload processing related information. In an embodiment, the workload monitoring module 410 is communicatively coupled to a monitoring module, such as the site one monitoring module 214 of FIG. 2, which transmits the workload metrics to the workload distribution module 204.

In an embodiment, both of the workload A 404 and workload B 414 further include a system state monitor 412. The system state monitor 412 communicates to the long distance continuous availability module 402 whether or not either workload A 404 or workload B 414 is currently operating within specified tolerances. When either of the workload A 404 or workload B 414 stops operating correctly, the system state monitor 412 notifies the long distance continuous availability module 402.

Figure 5:
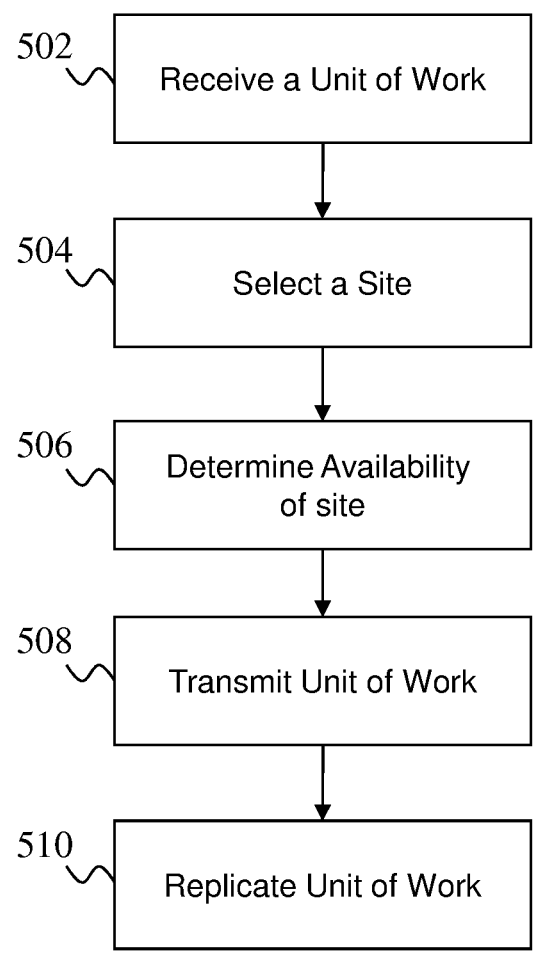
FIG. 5 illustrates a process flow of a continuous availability system in an embodiment.

FIG. 5 illustrates the overall flow of continuous availability system in an embodiment. In an embodiment, the process flow of FIG. 5 executes in the workload distribution module 204 of FIG. 2. At block 502 a unit of work data is received. The unit of work data may be data, a workload transaction, or a combination of both the workload transaction and data. At block 504 a site that supports the workload is chosen to process the unit of work data. The site is selected based on one or more workload distribution rules for the workload associated with the unit of work. The workload distribution rules are set by users of the system and are based on which configuration has been chosen for executing the workloads as will be described in more detail below. At block 506, it is determined if the site is capable of processing the unit of work data. The determination is made based on one or more user configurable settings and information about the performance and service level agreements (SLA) of the target workload. At block 508, the unit of work data is then transmitted to the site based on the user configurable settings, performance and SLA data for the workload, and the specific workload distribution configuration as described in more detail below. At block 510, the unit of work data is replicated between all instances of the workload.

As stated above, the long distance continuous available system includes various system configurations for supporting workload level continuous availability, disaster recovery, workload distribution, and replication. The various configurations are disclosed below and each workload will have its own configuration.

Active/Standby

In an embodiment, the active/standby configuration has a low RTO across two or more sites. In an embodiment, all of the two or more sites are nearly identical (i.e., each site has the same applications, same data, and similar hardware capabilities). In an alternate embodiment, one or more of the sites is configured with more or less hardware and/or software capabilities. The workload executes in one site, the active site, while the other one or more sites (i.e., the one or more standby sites) are active, but not processing any work for this workload. The workload distribution module 204 of FIG. 2 will route work to the active site, which will execute the workload in its entirety. When a transaction (e.g., an OLTP transaction) commits, any data updated in the active site will be captured, and the captured updates will be replicated from the active site to each of the one or more standby sites. In an embodiment, the captured updates will by synchronized using software based synchronous or asynchronous replication. In an additional embodiment, replication of captured updates may be performed using hardware using either synchronous or asynchronous methods. The latency for the update to be received at the one or more standby sites will be less than two seconds on average, and therefore the one or more standby sites will be behind the active site in terms of data currency by about two seconds.

In an embodiment, any of the one or more sites may be the active site for each individual workload executing in the active/standby configuration. For example, site A 302 of FIG. 3 may be the primary site for workload A 308, and therefore all transactions related to workload A 308 may be directed to site A 302, with replication synchronizing from site A 302 to site C 306. Meanwhile, site B 304 is the primary site for workload B 310, and therefore any transactions directed to workload B 310 will be directed to site B 304, with replication occurring between site B 304, and site A 302. Which site is the active site for a particular workload is determined by a workload distribution rule which is set by a system administrator. The workload distribution module 204 includes a workload distribution rule for each workload.

Although the workload is started, but is not processing work, on the one or more standby sites, the long distance continuous available system is configured to replicate changes in both directions (i.e., from the active site to the one or more standby sites and from the one or more standby sites to the active site). Therefore, if a switch to one of the standby sites occurs updates will be captured at the standby site, now the active site, and replicated to the previous active site, now a standby site.

In an embodiment, when the active site must be shut down for a maintenance activity, or any other a planned event, the system operator will initiate a planned site workload redirect from the active site to one of the standby sites. The workload distribution module 204 of FIG. 2 will direct all new transactions for the workloads to the standby site. Any transactions that were finished at the active site will be replicated to the standby site, and the standby site will become the active site.

Figure 6:
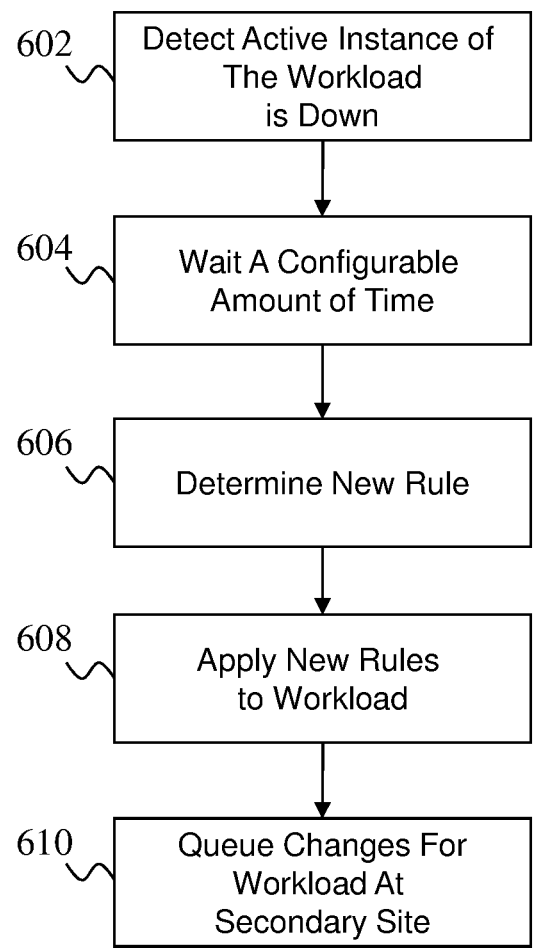
FIG. 6 illustrates a process flow of an active/standby configuration in an embodiment.

In an embodiment, when the active site becomes non-functional for any reason (i.e., an unplanned event) the workload distribution module will detect that the active site is non-functional and workloads will be directed to one of the standby sites. FIG. 6 illustrates a process flow of an active/standby configuration in an embodiment. In an embodiment, the process flow of FIG. 6 executes in the workload distribution module 204 of FIG. 2. At block 602, the workload distribution module 204 detects that the active instance of the workload is down. In an embodiment, the workload distribution module 204 detects that the active instance of the workload is down based on one or more failed attempts to transmit a transaction to the active instance of the workload. In an additional embodiment, the workload distribution module 204 detects that the active instance of the workload is down based on messages received from a workload monitoring module, such as one of the workload monitoring modules 410 of FIG. 4.

At block 604, the workload distribution module 204 waits a configurable period of time. The amount of wait time is configured by, for example, a system administrator and is used to prevent the workload distribution module 204 from transferring workloads from the active site to the standby site based on a momentary outage or delay in processing. If the configurable amount of time is set to zero, then the workload distribution module immediately transmits future workloads to the standby site as soon as the active site is detected as down.

At block 606, a new workload distribution rule is determined. The workload distribution rule indicates where workloads should be transmitted. In an embodiment, once the workload distribution module 204 determines the site is down, the workload distribution module 204 prompts an operator for a new workload distribution rule before transmitting any workloads to a standby site. In an additional embodiment, the workload distribution module 204 is configured to automatically determine or generate the new workload distribution rule for each workload. In yet another embodiment, the workload distribution module 204 is configured to prompt an operator, and if no response is received during a configurable period of time, the workload distribution module 204 will automatically determine or generate a new workload distribution rule automatically.

At block 608, the new workload distribution rule is applied to the workload distribution module 204, and any new requests for that workload will be transmitted to a one of the standby sites based on the new workload distribution rule. At block 610, any transactions received for any of the rerouted workloads are queued at the standby site until the active site is brought back online. Once the active site is brought back online, any queued transactions are replicated to the active site as described above. In an embodiment, once the active instance of the workload is back online, the workload distribution module 204 may redirect workload track back to the former instance of the active workload, either manually, or automatically.

After the standby instance of the workload becomes the active site, either for a planned or unplanned event, updates will be captured by the new active site for later replication back to the original active site.

For example, an operator may initiate a planned site redirect to move the active site from site A 302 to site C 306. When the operator reverts site A 302 to active status, the updates captured by site C 306 are replicated from site C 306 to site A 302 and, once site A 302 and site C 306 are nearly in synch, the workload distribution module 204 directs all new workloads to site A 302 and site A 302 once again becomes the active site. The original configuration is now restored.

Active/Query

The active/query configuration provides both a low RTO, and the ability to balance query workload transactions across two or more sites. In an embodiment, each active/query configuration is partnered with an active/standby configuration. Changes to workloads in the partner active/standby configuration are replicated and failover occurs using the partnered active/standby configuration using the same processing as described above. In an embodiment, the active/query configuration is used on a two site system, with a first site configured as the active site in the active/standby configuration, and a second site configured as the standby site. The second site is also configured as the primary query site, with the first site configured as the secondary query site. Both query sites are functional and query workload traffic may be routed to either site.

In an embodiment, the active/query configuration includes two or more sites. Each site includes the same applications, same data, and similar hardware capabilities. In an additional embodiment, each site may include different hardware and/or software capabilities. The active/query configuration includes two related workloads, an update workload with a read/write access, and a query workload with read only access. The update workload executes under an active/standby configuration, and the query workload works under a query configuration. Both workloads operate against the same data. The update workload executes in one site (a.k.a. the active site) which leaves idle standby capacity is the other sites (i.e., the standby sites). The query workload executes in both the active site and the standby site.

The workload distribution module 204 of FIG. 2 routes transactions that are directed to the update workload to the active site, which will execute those transactions. Any transactions routed to the query workload (i.e., read only transactions) will be routed between the active site and the standby site. In an embodiment, the query workloads are sent to either the active site or one of the standby sites based on the replication latency policy. If the replication latency is below a latency threshold defined in the latency policy the query workload transactions will be routed to either the active site or one of the standby sites. If the replication latency is above the latency threshold, then all query workload transactions will be routed to the active site. In an embodiment, the threshold latency is measured in seconds, although any time period may be used. In an additional embodiment, the threshold latency may be measured in number of transactions that are pending replication.

When a transaction, such as an OLTP transaction commits, the captured update(s) will be replicated from the active site to the standby site using the replication modules as described above. Furthermore, if the active site is down because of either a planned or unplanned outage, transactions are routed using the active/standby configuration described above.

Figure 7:
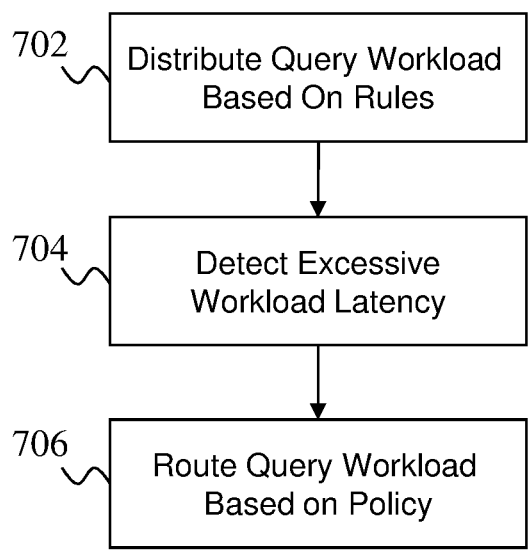
FIG. 7 illustrates a process flow for processing query workload transactions in an active/query configuration in an embodiment.

FIG. 7 illustrates a process flow for processing query workload transactions in an active/query configuration in an embodiment. In an embodiment, the process flow of FIG. 7 executes in the workload distribution module 204 of FIG. 2.

At block 702, update related workload transactions are processed as described above with regard to the active/standby configuration, however query workload transactions are routed based on rules. In an embodiment, the rules are configured by a system administrator and are based on a replication latency threshold as described above. At block 704, an increase is detected in the replication latency that exceeds the workload latency threshold. At block 706, query workload transactions are routed to the active site. The routing of transactions to the active site allows the standby site to free up processing bandwidth in order to provide as many processing resources as possible to the replication process.

In an embodiment, when the replication latency falls below the latency threshold, transactions are routed back to the standby site.

In an embodiment, as the replication latency approaches the threshold, a larger proportion of query workload transactions will be routed to the active site. For example, workload A 308 of FIG. 3 executes on site A 302 and its standby is in site C 306 and the query application Q (not shown) executes in both site A 302 and site C 306, The workload distributor will route the update workload to the active workload in site A 302. Additionally, the workload distributor will route query workload transactions to both query site A 302 and query site C 306. Update based workload transactions are being replicated from the active site A 302 to the standby site C 306.

As the replication latency approaches the replication latency threshold, the workload distribution module 204 will continue to route query workload transaction to both the query site C 306 and the query site A 302 because the replication latency is less than the latency threshold, however, more query requests get redirected to site A 302 (rather than site C 306). Once the latency exceeds the threshold, all query workload transactions are directed to site A 302. As the replication latency reduces, the process is reversed with more and more query transactions routed to query site C 306.

In an embodiment, when a query site is shut down for maintenance activity (i.e., a planned event), the workload distribution module 204 will dynamically direct all queries to the remaining query sites.

In an embodiment, when the active site becomes non-functional for some reason (i.e., an unplanned event), the workload distribution module 204 will detect that the active site is not functioning. As described above, once it is detected that the active site is down, either the operator will be prompted for permission to perform a workload switch and the workload distribution module 204 will redirect all new update workload connections to the standby site and all new query workload connections to the remaining query site once the operator responds; or the transition will be automatic and all new update workload connections and all new query workload connections will automatically be redirected to the standby site. The update workload standby site will become the active site and the query workload site will become the primary site for query workload transactions.

Active/Partitioned

The active/partitioned configuration provides a low RTO while balancing workload update requests across two sites and avoiding data conflicts. Data conflicts occur when two update transactions are processed simultaneously, or nearly simultaneously, at two different sites, both of which effect one or more of the same data elements. A conflict will occur when those transactions are replicated between the sites because the same data elements are being changed to different values during the replication process. In an active/partitioned configuration, each site is nearly identical (i.e., each site has the same applications, same data, and similar hardware or software capabilities). In an alternate embodiment, one or more of the sites is configured with more or less hardware and/or software capabilities. There is a single workload, but it is partitioned such that part of the workload will always be directed to one site (the first partition's active site), while the other part of the workload is always directed to the other site (the second partition's active site). One of the active sites serves as the standby site for other part of the workload and vice-versa.

The workload distribution module, acting as a content router, will query the content of each transaction and route the transaction to the site that is configured as the active site for that portion of the workload. That site will then execute the workload in its entirety. When a workload transaction (e.g., an OLTP transaction) commits, the captured updates will be replicated from the active site to the standby site as described above. In an embodiment, the standby site will be less than two seconds on average behind the active site in terms of data currency.

Figure 8:
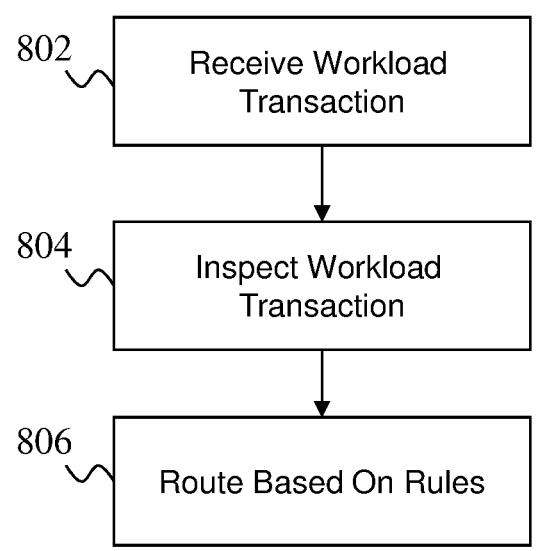
FIG. 8 illustrates a process flow for processing a workflow using an active/partitioned configuration in an embodiment.

FIG. 8 illustrates a process flow of processing a workflow using an active/partitioned configuration in an embodiment. In an embodiment, the process flow of FIG. 8 executes in the workload distribution module 204 of FIG. 2.

At block 802, a workload transaction is received. In an embodiment, the transaction is accepted and a positive acknowledgment is sent to the transmitter. The transmitter treats the acknowledgement of the received transaction as an indication that the transaction has reached its endpoint, and processing by the transmitter continues as if the transaction completed successfully.

At block 804, the workload transaction is inspected. In an embodiment, the workload distribution module 204 is configured to inspect the workload transaction to determine which site is the active site for that particular workload, or subset of a workload. The data, or a portion of the data, within the workload transaction is parsed and, at block 806, based on one or more data values, in conjunction with user specified rules, the workload distribution module 204 determines the active site for the workload transaction, and routes the workload transaction accordingly.

In an embodiment, the workload transaction includes an XML document, and the user supplied rules indicate one or more XML nodes within the document to inspect, and routing instructions based on one or more values within those nodes.

For example, in an embodiment, an active application A executes on both site A 302 and site C 306 of FIG. 3. The workload distribution module 204 will perform content based routing for application A. Workload transactions for application A include account numbers 1000-5000 for one set of customers and account numbers 5001-9000 to a second set of customers. The workload distribution module 204 is configured to route transactions referencing account numbers 1000-5000 to site A 302 and account numbers 5001-9000 to site C 306. Updates are replicated between the two sites.

In an embodiment, when the application in site A 302 is shutdown, for example, during a planned maintenance activity, the system operator will initiate a planned site workload redirect from the active workload in site A 302 to the active workload in site C 306. The workload distribution module 204 will direct all new connections to the active workload in site C 306 and it will become the single active site once any currently pending replication requests have been applied to the active workload in site C 306.

When site A 302 becomes non-functional for some reason, (i.e., an unplanned event) the workload distribution module 204 will detect that the active workload is no longer functional. As described above, once it is detected that the active site is down, either the operator will be prompted for permission to perform a site switch and the workload distribution module 204 will redirect all new workload connections to the standby site; or the transition will be automatic and all new workload connections will automatically be redirected to the standby site. The standby site will become the active site.

After site C 306 becomes the single active site, either for a planned or unplanned event, updates will be captured by the active workload in site C 306 for later replication back to the original workload in site A 302. Once site A 302 is back online, and replication is nearly complete, the workload distribution module 204 reverts to its original active/partitioned configuration.

Active/Active

In an embodiment, the active/active configuration has a low RTO and supports workload balancing of update requests across two or more sites based upon SLA achievement. In an active/active configuration each site is nearly identical (i.e., each site has the same applications, same data, and similar hardware capabilities). There is a single workload and it is spread across the two sites. One of the active sites serves as the standby site for other part of the workload and vice-versa.

Figure 9:
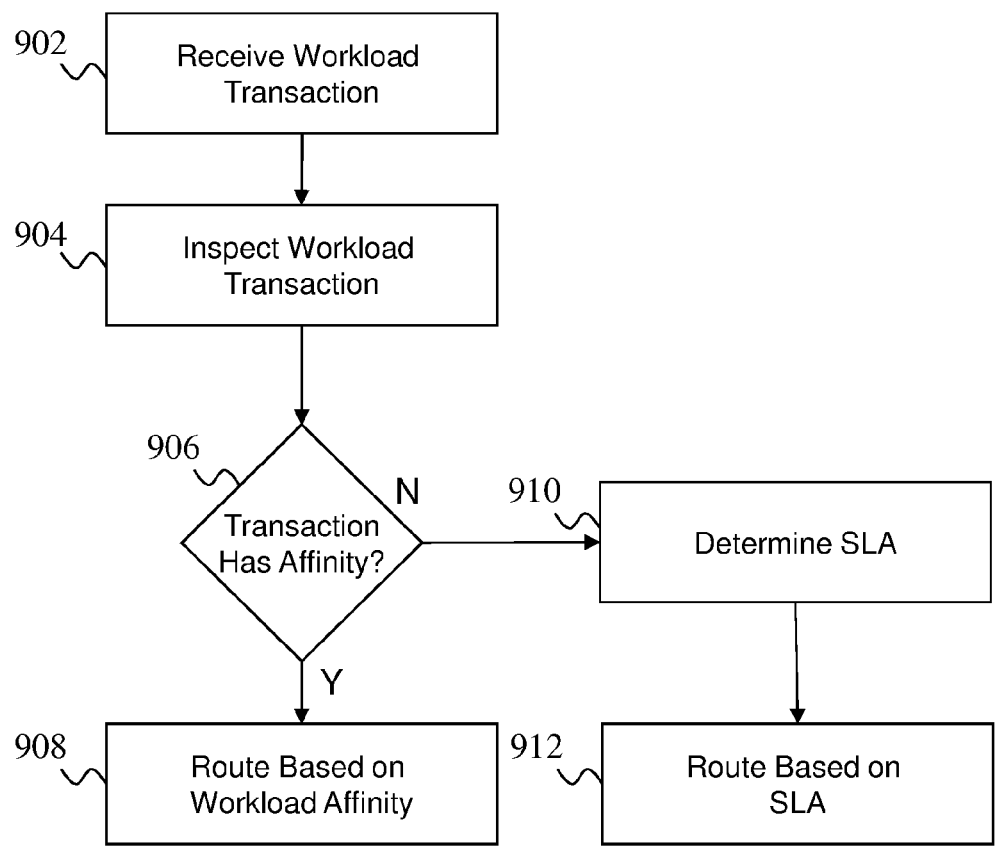
FIG. 9 illustrates a process flow of workload distribution in an active/active configuration in an embodiment.

FIG. 9 illustrates a process flow of workload distribution in an active/active configuration in an embodiment. In an embodiment, the process flow of FIG. 9 is executed by the workload distribution module 204 of FIG. 2. At block 902, a workload transaction is received. At block 904, the workload transaction is inspected. In an embodiment, the workload distribution module 204 is configured to inspect the data of the workload, and the data, or a portion of the data, within the workload transaction is parsed.

At block 906 the affinity of the workload is determined, based on one or more data values in the workload transaction, in conjunction with user specified rules. The workload distribution module 204 determines the active site for the workload transaction and routes the workload transaction accordingly.

In an embodiment, the workload distribution module 204 queries the content of each workload transaction. A transaction has affinity with one or more other transactions if there is a dependency between the two transactions. For example, if a first transaction makes an update to one column in a row of a relational database, and a second transaction is received that either reads that updated column, or updates a second column in the same row before the transaction has been replicated to the other sites, then there is affinity between those two transactions. If the transaction does not have any affinities with prior transactions, then at block 810, the transaction is routed to the site that will best meet the SLA objectives for the workload and will execute there in its entirety. In an embodiment, the SLA objectives include one or more of the current transaction processing time at each of the sites, the available processor capacity, the replication latency, and the available network capacity, however, in other embodiments any measure of service level may be used for determining the SLA.

In an embodiment, the site one monitoring module 214 of FIG. 2 monitors SLA metrics of the various workloads, hardware and software at all of the sites and transmits that data to the workload distribution module 204. The workload distribution module 204 uses these metrics to determine the current SLA metrics at each site. Returning to FIG. 9, at block 912, the SLA metrics received by the workload distribution module 204 are used to route workload transactions to a site based on which site meets SLA requirements that are configured for each workload.

Returning to block 906 of FIG. 9, if there are any affinities between the received transaction and any prior transactions, at block 908, the received transaction will be routed to the site where the prior transaction was processed in order to avoid data conflicts for the duration of the average replication latency.

When a transaction (e.g., an OLTP transaction) commits, any captured updates will be replicated from the active site that received and processed the transaction to each of the other active sites as described above. In an embodiment, the active workload in a site will be replicated in less than a couple seconds on average to a second site. Any transaction affinity that exists with that update remains in place until the update has been replicated between the various sites in the active/active configuration. In an embodiment, if more than two sites are included in the active/active configuration, transactional affinity remains in place until all sites in the configuration have replicated the group of transactions that have affinity (i.e., an affinity group).

For example, the active workload A 308 executes in both site A 302 and site C 306 of FIG. 3. The workload distribution module 204 performs content based routing to determine if there are affinities with prior transactions, and if not, will perform routing based upon the active site (either site A 302, or site C 306, both of which are active) that is best meeting SLA objectives for the workload A 308.

In an embodiment, at time-0, a workload transaction is executed in site A 302 and a subsequent workload transaction is received that has an affinity with the prior transaction. The workload distribution module 204 routes the workload transaction to site A 302 in order to avoid data conflicts. Any subsequent workload transactions with affinities to either the first or subsequent workload transaction will be routed to site A 302 until the updates have been replicated from site A 302 to site C 306.

At time-1, another workload transaction with no affinity is received. Site C 306 is determined to best meet the SLA objectives defined for the workload. The workload distribution module 204 will route the other workload transaction to site C 306. Updates are then replicated from site C 306 to site A 302.

At time-2, a fourth workload transaction is executed at site C 306, and a fifth workload transaction that has an affinity with the fourth workload transaction is received. The workload distribution module 204 routes the fifth workload transaction to site C 306 to avoid data conflicts. Any subsequent workload transactions with affinities to either the fourth or fifth workload transactions will be routed to site C 306 until the updates have been replicated from site C 306 to site A 302.

At time-3, a sixth workload transaction with no affinity is received. Site C 306 is determined to best meet the SLA objectives for the workload. The workload distribution module 204 will route workload transactions to site C 306. Updates are then replicated from site C 306 to site A 302.

When either of the sites is down, either as a result of planned maintenance, or for an unplanned outage, all workload transactions are routed to one of the other sites, updates will be captured, and any changes will be replicated to the downed site once it comes back online.

For example, when the active workload for application A in site A 302 is no longer available due to a planned or unplanned event, the workload distribution module 204 will direct all new workload requests to the active workload in site C 306 and the active workload in site C 306 becomes the single active site. Application A now executes in site C 306, and, if no other sites are available, site C has no active backup, but still captures updates for later replication to site A 302.

In an embodiment, when site A 302 is restored after the planned maintenance activity or unplanned failure, the system operator will initiate a planned site workload redirect to restore the original configuration. The captured updates are replicated from the active workload in site A 302 to the active workload in site C 306. Once the active workload in site A 302 and the active workload in site B 306 are nearly in synch, the workload distribution module 204 starts distributing transactions across both active sites, and the original configuration is restored.

Technical effects and benefits include a mechanism for load balancing, workload redirection, and replication of one or more workload's transactions and data across a number of sites separated by unlimited distances using various configurations to provide flexibility. An additional benefit includes an active/standby configuration which provides a low recovery time objective. A further benefit includes an active/query configuration that provides a low recovery time objective, and the use of a secondary site for distributing query transactions. Another benefit includes an active/partitioned configuration that provides a low recovery time objective and supports partitioning of workload transactions between two sites based on the content of the workload transactions. Yet another benefit includes an active/active configuration that provides a short recovery time objective along with service level based load balancing of workload transactions. A further benefit includes the ability to manage changes in a workload environment by manually transitioning from a primary workload to a secondary workload prior to performing maintenance on the primary workload, and vice versa.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be constructed to maintain the proper protection for the invention first described.

What is claimed is:

1. A continuous availability system, comprising:
a computer processor; and
a workload distribution module executable by the computer processor, the system configured to:
   establish a plurality of workload distribution rules, comprising a workload distribution rule for each of a plurality of workloads, wherein a first workload distribution rule applies to a first workload and a second workload distribution rule applies to a second workload;
   receive four or more units of work data, comprising a first unit of work data for a first workload replicated in a plurality of first replicas across a plurality of sites, and a second unit of work for a second workload replicated in a plurality of second replicas across the plurality of sites;
   select a primary replica of the first workload from among the plurality of first replicas to process the first unit of work data based on the first workload distribution rule;
   select a primary replica of the second workload from among the plurality of second replicas to process the second unit of work data based on the second workload distribution rule;
   wherein the primary replica of the first workload and the primary replica of the second workload exist simultaneously and are located on distinct sites from each other among the plurality of sites;
   determine, based on one or more user configurable settings, that the primary replica of the first workload is capable of processing a third unit of work data for the first workload, the third unit of work data being among the four or more units of work data;
   transmit the third unit of work data to the primary replica of the first workload responsive to determining that the primary replica of the first workload is capable of processing the third unit of work data; and
   replicate the third unit of work data between the primary replica of the first workload and a secondary replica of the first workload, the secondary replica being from among the plurality of first replicas;
   wherein each of the four or more units of work data is distributed among the plurality of sites according to the first workload distribution rule using one of:
      an active/standby configuration,
      an active/query configuration,
      an active/partitioned configuration, and
      an active/active configuration;
   wherein a fourth unit of work data of the four or more units of work data is distributed among the plurality of first replicas across the plurality of sites using the active/query configuration, and wherein the system is further configured to:
      inspect the fourth unit of work data;
      determine whether the fourth unit of work data is a query transaction;
      transmit the fourth unit of work data to the primary replica of the first workload if the fourth unit of work data is not a query transaction; and
      if the fourth unit of work data is a query transaction:
         determine replication latency for the fourth unit of work data from the primary replica of the first workload to the third workload designated for queries;
         if the replication latency exceeds a latency policy threshold, route the query transaction to the primary replica of the first workload; and
         if the replication latency does not exceed the latency policy threshold, route the fourth unit of work data to the third workload designated for queries.

2. The system of claim 1, wherein the one or more user configurable settings includes one of:
   a real-time prompt from an operator;
   an availability of the primary replica of the first workload;
   a user command to shut down the primary replica of the first workload;
   replication latency; and
   one or more service level agreement settings.

3. The system of claim 1, wherein the four or more units of work data comprise five or more units of work data, and wherein a fifth unit of work data of the five or more units of work data is distributed among the plurality of first replicas across the plurality of sites using the active/standby configuration, the system further configured to:
   detect that the primary replica of the first workload is unavailable; and
   responsive to detecting that the primary replica of the first workload is unavailable:
      wait for a period of time;
      determine if the primary replica of the first workload is still unavailable; and
      transmit the fifth unit of work data to the secondary replica of the first workload responsive to determining that the primary replica of the first workload is still unavailable.

4. The system of claim 1, wherein the four or more units of work data comprise five or more units of work data, and wherein a fifth unit of work data of the five or more units of work data is distributed among the plurality of first replicas across the plurality of sites using the active/active partitioned configuration, the system further configured to:
   inspect the fifth unit of work data to determine one or more data values in the fifth unit of work data; and
   route the fifth unit of work data to one of the primary replica of the first workload and the secondary replica of the first workload based on the one or more data values.

5. The system of claim 1, wherein the four or more units of work data comprise five or more units of work data, and wherein a fifth unit of work data of the five or more units of work data is distributed among the plurality of first replicas across the plurality of sites using the active/active configuration, the system further configured to:
   inspect the fifth unit of work data to determine a value of one or more data items in the fifth unit of work data;
   determine, based on the value of the one or more data items in the fifth unit of work data, if the fifth unit of work data has affinity to one or more previously received units of work data; and
   route the fifth unit of work data to a same replica of the first workload that the one or more previously received units of work data were transmitted to, responsive to determining that the fifth unit of work data has affinity to the one or more previously received units of work data.

\* \* \* \* \*